Figures 1, 2:
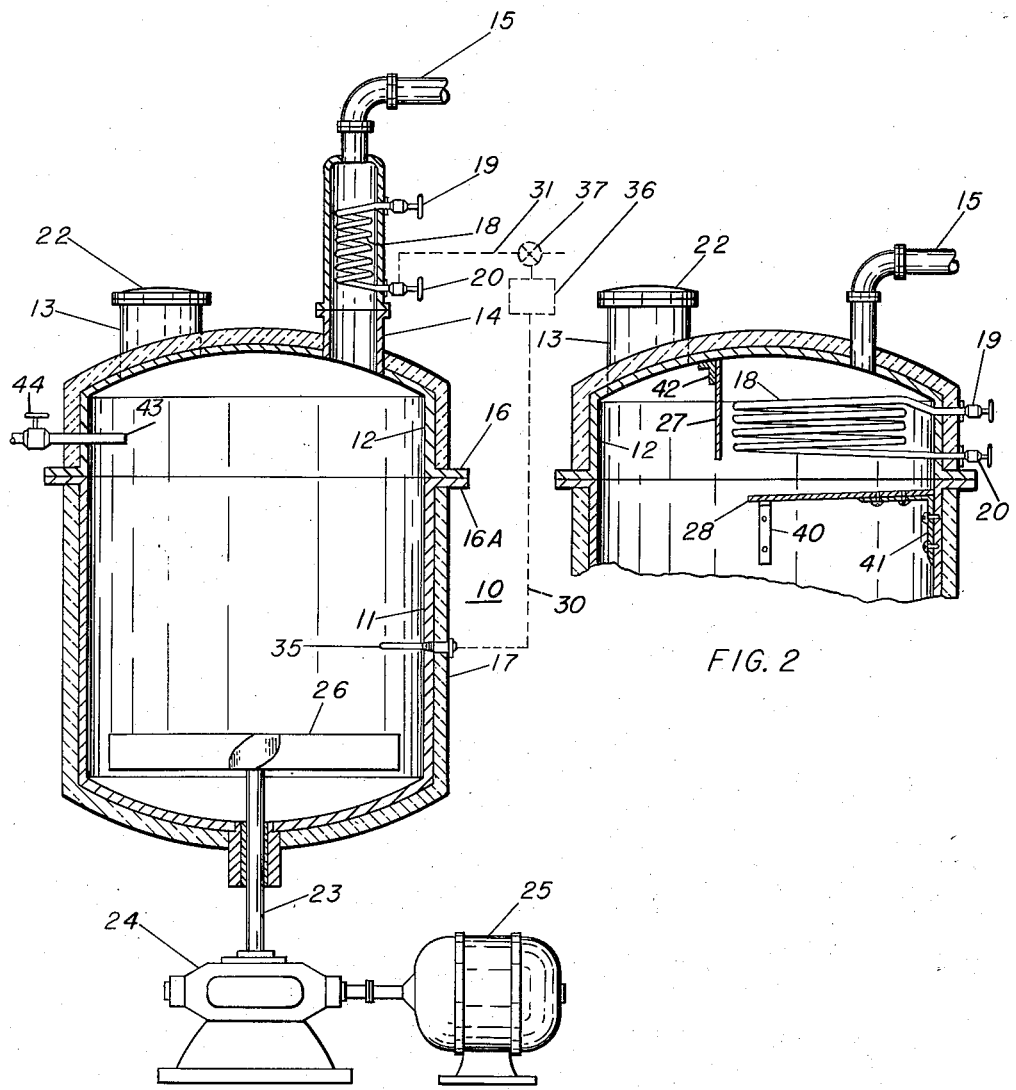

Nov. 6, 1951     L. L. MALM     2,573,978

METHOD FOR DISSOLVING CELLULOSE XANTHATE

Filed June 5, 1947

INVENTOR
L. LOUIS MALM
BY
ATTORNEY

Patented Nov. 6, 1951

2,573,978

UNITED STATES PATENT OFFICE 2,573,978

METHOD FOR DISSOLVING CELLULOSE XANTHATE

L. Louis Malm, Rocky River, Ohio, assignor to Industrial Rayon Corporation, Cleveland, Ohio, a corporation of Delaware Application June 5, 1947, Serial No. 752,581

8 Claims. (Cl. 260—217)

1

This invention relates to the preparation of viscose and, more particularly, to a method for controlling the temperature of the viscose solution within a dissolver.

In the normal preparation of a viscose solution, cellulose xanthate crumbs are dissolved in an aqueous alkali solution. Since some aging of the xanthate takes place during dissolution, it is generally desirable to carry out the dissolution at a substantially constant reasonably low temperature, uniform throughout the solution. Such a temperature is, however, difficult to maintain with available equipment.

During dissolution, heat is generated in the dissolver due to heat of solution, heat of reaction, and mechanical heat. As a result, the temperature within the dissolver generally tends to be greater than desired and, therefore, the dissolvers are usually equipped with means for removing heat and controlling the solution temperature. For example, the temperature within a dissolver is commonly controlled by circulating a cooling fluid through a jacket in which the dissolver is partly or wholly enclosed. Generally with the aid of agitation of the solution, heat is thus dissipated through the walls of the dissolver.

The above method, however, for the removal of heat from the solution is not entirely satisfactory. The solution temperature is generally not uniform, for, irrespective of the fact that an agitator is utilized, the solution adjacent to the outer cooler walls becomes chilled and very viscous, thereby acting somewhat as an insulator. As the viscosity of the solution increases, there is, of course, much less tendency for the fluid adjacent to the chilled walls of the dissolver to flow to the interior and into the agitated regions. Consequently, the more viscous fluid next to the chilled wall becomes still more viscous and offers increasing resistance to the outward flow of heat. These uncontrolled temperature conditions result in undesirable non-uniform aging of the xanthate or viscose solution. In view of the desirability and importance of proper and controlled uniform aging of the viscose solution, it is therefore advantageous to have as uniform as possible heat distribution and temperature control in the dissolving operation.

By the practice of the present invention, the temperature of a viscose solution may be effectively controlled by suitable adjustment of the boiling point of the solution through the application of a vacuum and by condensation and return of some part of the water thus vaporized from the solution. Besides assisting in reducing the temperature, the returned condensate helps to maintain a desirable concentration and viscosity of solution, which properties may be controlled by the proportion of water returned to the solution. The apparatus used in the practice of this invention may have various modifications and generally the process dispenses with the necessity for cooling jackets.

Instead of returning condensate water to the solution, it may be more desirable, in some cases, to add water to the solution through an inlet, possibly below the level of the solution so as to insure better contact and distribution in the solution. In other cases it may be advantageous to start with more than the desired amount of water, so calculated that after removal of an estimated amount of water by vaporization the required amount of water remains in the solution to give the ultimately desired concentration. Of course, various combinations of these methods of attaining the proper concentration may also be desirable. It is desirable, however, that water vapor be condensed and not allowed to pass through the vacuum pump since this condensation permits a lower displacement capacity in the design of the pump. While the vacuum is being applied to the viscose solution, it is particularly advantageous to agitate the solution by suitable means.

The apparatus for carrying out the above process may comprise a standard type dissolver with an outlet near the top connected to a vacuum pump. Located in the path of the escaping vapor and gases, a cooling device serves to condense water vapor and return condensate water to the solution while some vapor and other gases are evacuated. The degree of cooling is advantageously regulated by a means responsive to the solution temperature in the dissolver. For example, such means may regulate the rate of flow of coolant through a condenser so as to adjust the rate of cooling in accordance with the cooling requirements of the solution. Thus the apparatus may automatically be regulated by such means to give a uniform desired temperature.

The aforesaid method is described in greater detail in the following description of the accompanying drawings; where:

Figure 1 represents, in substantial cross section, a side elevation of the dissolving apparatus; and Figure 2 represents a modification of the upper portion of the apparatus of Figure 1.

Referring to the drawing, a tank 10, which may be used for dissolving xanthate in alkali solution, is formed of two sections 11 and 12.

The sections have flanges 16A and 16 respectively which may be suitably held together by any desirable means, such as by clamps or bolts. In the top section 12 there is provided a manhole 13 having a cover 22. Substantially diametrically opposite the manhole 13 in the section 12 there is positioned an exhaust chamber 14 which is connected by means of a conduit 15 to a vacuum pump (not shown). The tank or dissolver 10 is preferably lagged by a suitable insulating material 17 to prevent heat absorption from the exterior.

Within the exhaust chamber 14 there is provided a cooling coil 18 through which is circulated a cooling fluid. The cooling fluid may be admitted through a valve 19 and exhausted through valve 20. The vapor and gases which are exhausted from within the dissolver will, of course, come in contact with the cooling coil 18 since it is positioned in the exhaust path. Upon contact with the cooling coil 18 the water vapor will condense and the uncondensed vapors and gases are exhausted through the conduit 15. The condensate is desirably returned to the dissolver. The bottom section of the dissolver is also provided with a customary agitator 26 mounted on a shaft 23. The agitator 26 may be a single propeller blade driven by means of a gear-reducing device 24 connected to a motor 25.

The desired solution temperature may be maintained by adjusting the pressure over the solution, by means of a vacuum pump, to that reduced pressure at which the solution has a boiling point corresponding approximately to the desired temperature. Heat is withdrawn from the solution as heat of vaporization which is transferred to and removed by the cooling fluid running through condenser 18. The condensate is returned to the solution at the condensation temperature, or at a lower temperature, which is determined by the temperature and rate of flow of the cooling liquid in the condenser.

Referring to the drawing there is positioned within the side of the dissolver a temperature sensitive element or bulb 35. This bulb extends into the interior of the dissolver far enough to be sensitive to internal solution temperatures.

The temperature sensitive element 35 is connected by a suitable transmitting means 30, either electric or pneumatic, to a controller 36 of any desirable type. The controller 36, in turn, is adapted to transmit a correcting impulse thereby operating a regulator 37 which is adapted to control the flow of coolant through conduit 31 to the cooling coil 18. Thus, a change in the solution temperature will effect a corresponding change in the rate of flow of cooling fluid through the condenser 18 and therefore, the quantity and temperature of the condensate that is returned to the solution. The system will be in equilibrium if the amount of water being returned to the solution as condensate water is practically equivalent to the amount being removed as water vapor. Through such an equilibrium cycle there is advantageously maintained a uniform and constant concentration and viscosity, as well as a uniform temperature, throughout the solution.

There is shown in Figure 2 a modification of the upper section of the dissolver. Instead of a chamber 14 enclosing the condenser 18, the condenser is positioned in the top of section 12 of the dissolver. However, baffles 27 and 28 are desirably provided in order to direct the flow of the gases and vapor into contact with the condenser 18. The baffles may be supported in any suitable manner as by means of brackets 40, 41 and 42.

Water can be added to the solution, if it is necessary or desired, by means of an external supply as indicated in Figure 1 by the pipe 43 positioned in the wall of the dissolver. A control valve 44 is provided to regulate the flow of water. This external water source can supplement the condensate or it can replace the condensate entirely. Further, the pipe 43 although shown in the upper portion of the dissolver can just as well be positioned below the level of the solution.

The invention will be further illustrated by the following example.

*Example*

An aqueous sodium hydroxide solution having a concentration of about 4 percent sodium hydroxide and a temperature of about 10° C. is run into a dissolver of the type indicated in the accompanying drawing. Through the manhole 13, enough cellulose xanthate crumbs having a temperature of about 25° C. are added with agitation to give an ultimate viscose solution containing about 7 percent cellulose. After the manhole cover is closed and secured, the gases and vapors are evacuated from the dissolver by a vacuum pump designed to give the desired reduced pressure in about 3-5 minutes. Simultaneously with the starting of the vacuum pump the valve to the condensing device 18 is opened and the rate of cooling fluid adjusted to be slightly in excess of the amount calculated to remove heat generated by the heat of solution, heat of reaction and mechanical heat. The pressure is adjusted to about 15 mm. to give a solution temperature of about 18° C. The normal dissolving time is about two hours. Agitation is continued throughout the entire operation.

A proper degree of vacuum is preferably first established in the dissolver which will bring about the desired solution temperature. A constant reduced pressure is then maintained of such a degree as to keep the temperature within the solution for this particular stage at generally about 18° C. The heat which is given off during the dissolution is then dissipated by the vaporization of water, and the resultant water vapor, as explained, is condensed and returned to the solution.

The amount of water vapor lost with the uncondensed gases should be small or of a controlled amount so that water losses will not undesirably affect the solution concentration. Besides serving as a means for effecting even temperature distribution throughout the viscose solution, the process of this invention also accomplishes complete deaeration of the viscose at an early stage and immediate removal of gaseous reaction products as formed.

I claim:

1. The method of preparing a viscose solution at below a reduced boiling temperature which comprises, adding cellulose xanthate to a dilute aqueous alkali solution, subjecting the mixture to a vacuum, maintaining a temperature below the reduced boiling temperature of the solution, and boiling off water when the temperature of the solution rises to that of the reduced boiling temperature to reduce the temperature to below boiling.

2. The method of preparing a viscose solution at below a reduced boiling temperature which comprises, adding cellulose xanthate to a dilute aqueous alkali solution, agitating the resulting mixture, subjecting the agitated mixture to a vacuum, maintaining a temperature below and not over the reduced boiling temperature, evaporating water from the aqueous alkali solution mixture when the solution temperature rises to the reduced boiling point, the evaporation of water reducing the boiling temperature of the solution to below the reduced boiling temperature.

3. The method of preparing a viscose solution at below a reduced boiling temperature which comprises, adding cellulose xanthate to a dilute aqueous sodium hydroxide solution, agitating the resulting mixture, subjecting the agitated mixture to a vacuum, maintaining the temperature of the mixture at below the boiling point of the mixture, evaporating water from the mixture when the solution temperature rises to that of the reduced boiling temperature, condensing the water vapor, and returning the condensed water to the solution to reduce the increase in the solution temperature to below the reduced solution boiling point.

4. The method of preparing a viscose solution at below a reduced boiling temperature which comprises, adding cellulose xanthate to a dilute aqueous sodium hydroxide solution, agitating the resulting mixture, subjecting the agitated mixture to a vacuum, maintaining the temperature of the mixture at below the boiling point of the mixture, evaporating water from the mixture when the solution temperature rises to that of the reduced boiling temperature, adding water to the solution to reduce the increase in the solution temperature to below the reduced solution boiling point, and maintaining the temperature below the reduced boiling point temperature by controlling the addition of water to the solution.

5. The method of preparing a viscose solution at below a reduced boiling temperature which comprises, adding cellulose xanthate to a dilute aqueous sodium hydroxide solution, agitating the resulting mixture, subjecting the agitated mixture to a vacuum, maintaining the temperature of the mixture at below the boiling point of the mixture, evaporating water from the mixture when the solution temperature rises to that of the reduced boiling temperature, condensing the water vapor, returning the condensed water to the solution to reduce the increase in the solution temperature to below the reduced solution boiling point, and maintaining the temperature below the reduced boiling temperature by supplementing the returned condensate with water in an amount approximately equivalent to that required to maintain the reduced temperature.

6. The method of preparing a viscose solution at a temperature below a reduced boiling temperature of about between 15 and 20° C. which comprises, adding cellulose xanthate having a temperature above 20° C. to a dilute aqueous sodium hydroxide solution having a lower temperature than said cellulose xanthate, agitating the resulting mixture, subjecting the mixture to a vacuum to produce a boiling temperature of between about 15 and 20° C., evaporating water from the mixture when the temperature rises to boiling, condensing the water vapor, and returning the condensate water to the mixture.

7. The method of preparing a viscose solution at a temperature below a reduced boiling temperature of about between 15 and 20° C. which comprises, adding cellulose xanthate having a temperature above 20° C. to a dilute sodium aqueous hydroxide solution having a lower temperature than said cellulose xanthate, agitating the resulting mixture, subjecting the mixture to a vacuum to produce a boiling temperature of between about 15 and 20° C., evaporating water from the mixture when the temperature rises to boiling, condensing the water vapor, and returning the condensate water to the mixture in an amount approximately equivalent to that lost by the boiling.

8. The method of preparing a viscose solution at a temperature below a reduced boiling temperature of about between 15 and 20° C. which comprises, adding cellulose xanthate having a temperature of over 20° C. to a dilute aqueous sodium hydroxide solution having a temperature of between about 8 and 12° C., agitating the resulting mixture, subjecting the mixture to a vacuum to produce a reduced boiling point of between about 15 and 20° C., evaporating water when the temperature rises to the reduced boiling point, and adding water to the boiling mixture in an amount approximately equivalent to that required to maintain the temperature below the boiling point.

L. LOUIS MALM.

REFERENCES CITED

The following references are of record in the file of this patent:

UNITED STATES PATENTS

| Number | Name | Date |
|---|---|---|
| 855,213 | Waddell | May 28, 1907 |
| 986,306 | Naudin | Mar. 7, 1911 |
| 1,402,318 | Rodebush | Jan. 3, 1922 |
| 1,656,120 | Kempter | Jan. 10, 1928 |
| 1,681,900 | Mendel | Aug. 21, 1928 |
| 1,807,370 | Bernard | May 26, 1931 |
| 1,920,702 | Lautenberg | Aug. 1, 1933 |
| 1,960,855 | Sommer | May 29, 1934 |
| 2,117,038 | Richter | May 10, 1938 |
| 2,122,188 | Vollrath | June 28, 1938 |
| 2,136,030 | Stone | Nov. 8, 1938 |
| 2,240,618 | Harris, Jr., et al. | May 6, 1941 |
| 2,249,175 | Richter | July 15, 1941 |